United States Patent [19]

Short et al.

[11] Patent Number: 5,604,713

[45] Date of Patent: Feb. 18, 1997

[54] CIRCUITRY AND METHOD THAT ALLOWS FOR EXTERNAL CONTROL OF A DATA SECURITY DEVICE

[75] Inventors: Timothy A. Short, Duncanville; Matthew H. Childs, Arlington, both of Tex.

[73] Assignee: National Semiconductor Corporation, Santa Clara, Calif.

[21] Appl. No.: 575,209

[22] Filed: Dec. 19, 1995

[51] Int. Cl.[6] .................................................. G11C 13/00
[52] U.S. Cl. .............................. 365/230.06; 365/189.04; 365/233
[58] Field of Search ................... 365/189.04, 230.01, 365/233, 193, 203, 230.06

[56] References Cited

U.S. PATENT DOCUMENTS 5,499,218  3/1996  Ahn et al. ............................. 365/203

Primary Examiner—Terrell W. Fears
Attorney, Agent, or Firm—Limbach & Limbach L.L.P.

[57] ABSTRACT

A data security device is unitarily formed in an integrated circuit. A processor of the data security device operates in response to a clock signal provided at a clock input of the processor. Clock signal generation circuitry generates an internal clock signal. First processor-readable program code is configured to cause the processor to detect an internal, protectable, non-volatile indication of a state of the integrated circuit data security device. For example, one indication may be that non-volatile memory of the data security device has never been initialized. Another indication may be that the non-volatile memory of the data security device contains a manufacturing test pattern. Clock signal selection circuitry selectively provides a path for either the internal clock signal to be provided to the clock input of the processor or, alternatively, for an externally-provided clock signal to be provided to the clock input of the processor. Second processor-readable program code is configured to cause the processor to control the selection by the clock signal selection circuitry responsive to the state indication.

10 Claims, 5 Drawing Sheets

CIRCUITRY AND METHOD THAT ALLOWS FOR EXTERNAL CONTROL OF A DATA SECURITY DEVICE

TECHNICAL FIELD

The invention relates to testing of data security devices and, in particular, to a circuit and method that allows for external control of a data security device without compromising secure data.

BACKGROUND

Integrated circuit data security devices are known in the art. For example, such data security devices are used by the U.S. Government to protect sensitive government information.

One known way to "break" a data security device is to provide a very slow externally-controlled system clock to the data security device. If the externally-provided clock is sufficiently slow, one may use integrated circuit probing techniques (such as E-beam probers) to determine the state of internal nodes of the data security device and, thus, determine the contents sensitive information that the data security device was designed to protect. For this reason, as a safeguard, conventional data security devices cannot be driven by an externally-controlled clock.

However, this safeguard makes the conventional data security device difficult to test since most (if not all) testers must control the clock signal of the integrated circuit that they are testing. That is, the tester is designed to provide all of the inputs to the integrated circuit, including the clock signal. After each pulse of the tester-provided clock signal, the tester looks for an expected pattern on the integrated circuit outputs. Thus, if the integrated circuit is not operable with an external clock, provided from a tester, resort must be had to non-conventional custom (thus expensive) testers.

SUMMARY

In accordance with one aspect of the present invention, a data security device is provided which is unitarily formed in an integrated circuit. A processor of the data security device operates in response to a clock signal provided at a clock input of the processor. Clock signal generation circuitry generates an internal clock signal. First processor-readable program code is configured to cause the processor to detect an internal, protectable, non-volatile indication of a state of the integrated circuit data security device. For example, one indication may be that non-volatile memory of the data security device has never been initialized. Another indication may be that the non-volatile memory of the data security device contains a manufacturing test pattern.

Clock signal selection circuitry selectively provides either a path for one of the internal clock signal to be provided to the clock input of the processor or, alternatively, a path for an externally-provided clock signal to be provided to the clock input of the processor.

Second processor-readable program code is configured to cause the processor to control the selection by the clock signal selection circuitry responsive to the state indication.

DETAILED DESCRIPTION

Figure 1:
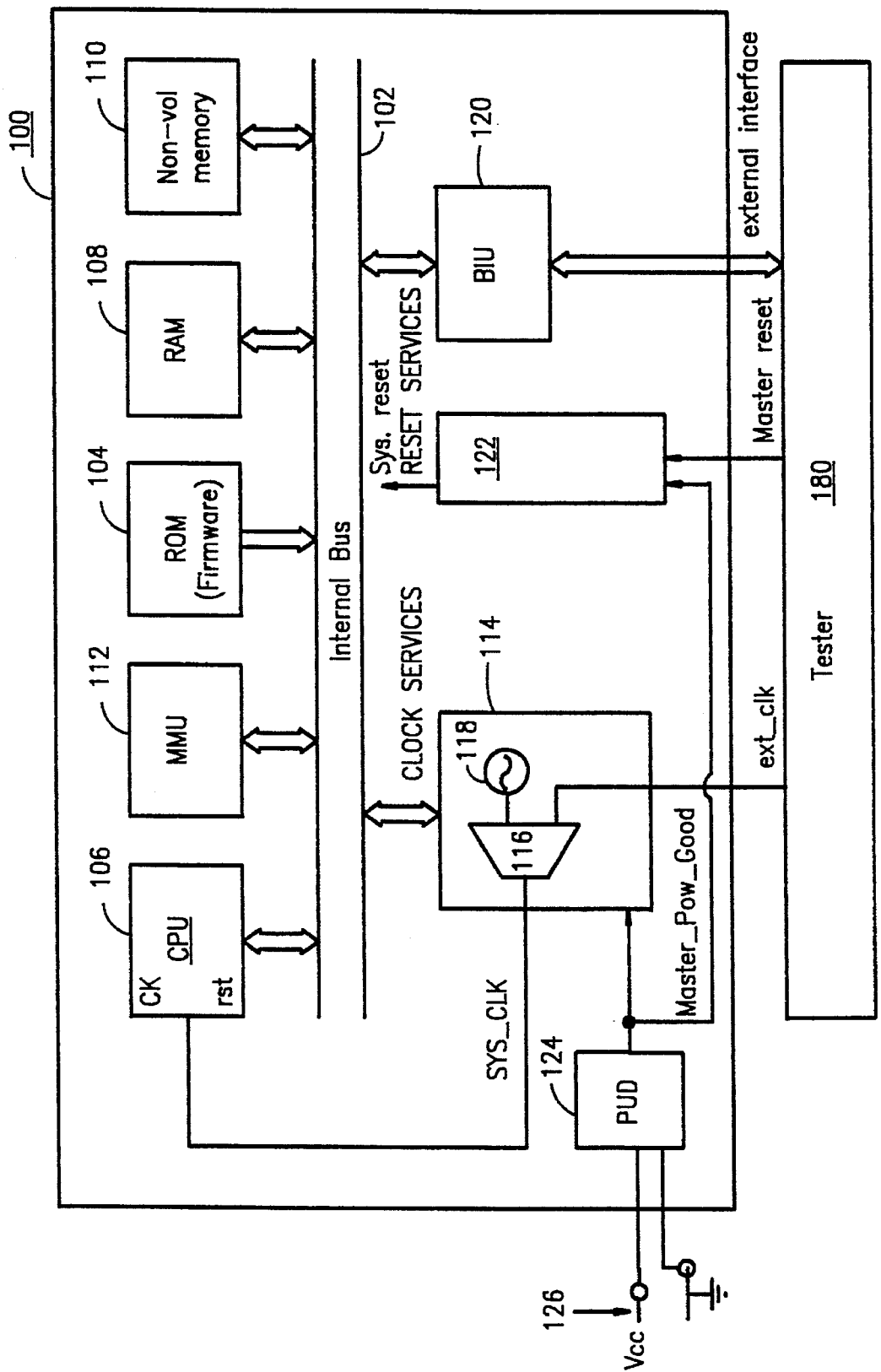
FIG. 1 is a block diagram illustrating a data security device in accordance one embodiment of the present invention, and its connection to a tester.

Referring now to FIG. 1, a data security device 100 is shown connected to a tester 180. A significant security feature of the data security device 100 is that it is unitarily formed in an integrated circuit. An internal bus 102 connects various elements of the data security device 100. First, a read-only memory (ROM) 104 connected to the internal bus 102 includes firmware that is executed by a processor (CPU) 106, also connected to the internal bus 102. A random-access memory (RAM) 108 provides working memory for the executing firmware. Non-volatile memory 110 (which may be, for example, electrically erasable PROM or battery-backed RAM) is also provided. Typically, in use of the data security device 100, the non-volatile memory 110 holds sensitive information to be protected, such as cryptographic keys.

A memory management unit (MMU) 112, also connected to the internal bus 102, provides support circuitry for the CPU 106 to implement firmware code privilege domains. For a processor that does not otherwise implement firmware code privilege domains, the MMU 112 may be of the type disclosed in U.S. patent application Ser. No. 523,052, filed Sep. 1, 1995 by James Scott Johnson et al., which simulates firmware code privilege domains. Strictly speaking, though, all that is required is a mechanism for securing at least a portion of the firmware, such as not allowing the CPU 106 to execute off-chip code.

A reset service logic block 122 receives a master reset signal and processes the master reset signal to generate an internal system reset signal which is then provided to the various components of the data security device 100. In addition, a "power up detect" device (PUD) 124 is connected to the external power supply 126 of the integrated circuit in which the data security device 100 is formed, and asserts a master_power_good signal when the voltage provided by the external power supply 126 is within a predetermined operating range. In addition, the reset services block 122 receives the master_power_good signal and generates the system reset signal while the master_power_good signal is deasserted.

A system clock signal, SYS_CLK, provided at the CK input to the CPU 106 provides a time base to which the CPU 106 executes firmware instructions. The system clock signal, SYS_CLK, is provided by a clock services logic block 114. A bus interface unit 120 provides an interface between the components of the data security device 100, via the internal bus 102, to circuitry (e.g., external memory, not shown, or the tester 180) that is external to the data security device 100. Significantly, the clock services logic block 114 utilizes the master_power_good signal but does not utilize the system reset signal. The significance of this will be addressed in more detail later in this disclosure.

In response to the system reset signal being deasserted, the CPU 106 executes device configuration determination firmware (described in detail below with reference to FIG. 2), which is a portion of the firmware stored in the ROM 104, in order to determine whether the configuration of the data security device 100 is "operational" or is "pre-operational". "Pre-operational" means that there is no sensitive data in the data security device 100 to protect (e.g., the data security device 100 is in stages of manufacture or test). "Operational" means that there is sensitive data in the data security device 100 to protect or that the data security device 100 is in a state of readiness to accept or generate sensitive data. For example, in general, a data security device 100 that has been fully tested is in an operational configuration. Clock selection control firmware, which is also a portion of the firmware stored in the ROM 104, causes the CPU 106 to control the configuration of a clock services logic block 114 depending on the device configuration determined by the device configuration determination firmware.

In particular, if the data security device 100 is in the "operational" configuration, the clock selection control firmware does nothing. That is, upon power-up of the data security device (as indicated to the clock services logic block 114 by assertion of the master_power_good signal), the data selector circuitry 116 within the clock services logic block 114 defaults to providing an internal clock signal, generated by internal oscillator 118 (which may be, for example, a conventional ring oscillator), as the system clock signal, SYS_CLK. Thus, if the data security device 100 is in the "operational" configuration, no action is required by the clock selection control firmware.

Alternately, if the data security device 100 is in the "pre-operational" configuration, the clock selection control firmware configures the data selector circuitry 116 to provide an external clock signal. The external clock signal is nominally provided by tester 180.

Figure 2:
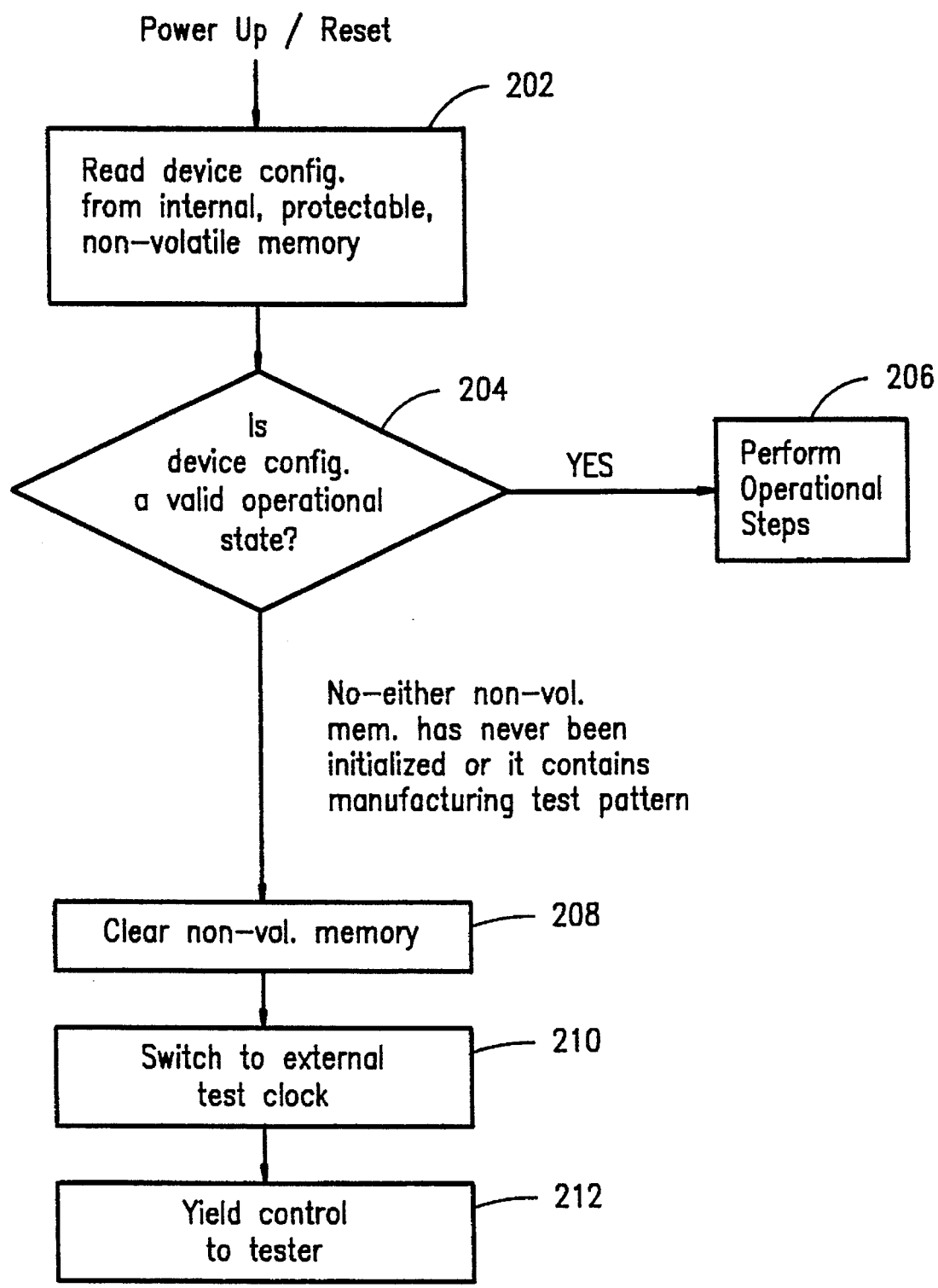
FIG. 2 is a flowchart illustrating execution flow of the program code within the ROM of the FIG. 1 data security device.

A flowchart of a particular implementation of the device configuration determination firmware and the clock selection control firmware is shown in FIG. 2. As discussed above, the device configuration determination firmware and clock selection control firmware are executed by the CPU 106 upon deassertion of the system reset signal (which results from the assertion of the master_power_good signal and deassertion of the master reset signal).

First, at step 202, the device configuration determination firmware causes the CPU 106 to read an indication of the configuration of the data security device 100 by inspecting the non-volatile memory 110. For example, one way to determine that a particular data security device 100 is in an "operational" configuration may be to determine if a special signature has been written into the non-volatile memory 110. Another way to determine that a particular data security device 100 is in an "operational" configuration may be to determine if a test pattern has been written into the non-volatile memory 110, indicating that the data security device 100 has already been tested.

Then, at step 204, the device configuration determination firmware causes the CPU 106 to determine if the device configuration indication indicates that the data security device is "operational". If so, step 204 of the device configuration firmware causes the CPU 106 to branch to step 206, where the CPU performs normal operational steps. However, if the CPU 106 determines that the device configuration indication indicates that the data security device is "pre-operational", then the CPU 106 begins to execute the clock selection control firmware (starting at step 208). Step 208 of the clock selection configuration firmware causes the CPU 106 to clear the non-volatile memory 110. This is done as a precautionary measure in case, for some reasons, sensitive information is held in the non-volatile memory 110.

Alternately, part of the device configuration indication determined by inspecting the non-volatile memory 110 may be that the non-volatile memory 110 is holding sensitive information. In this case, step 204 of the device configuration firmware would cause the CPU 106 to branch to step 206 and would not allow the clock selection control firmware to possibly compromise this sensitive data by configuring the data selector circuitry 116 to provide an external clock signal.

After step 208 of the clock selection control firmware causes the CPU 106 to clear the non-volatile memory 110, step 210 of the clock selection control firmware causes the CPU 106 to configure the data selector circuitry 116 to provide an external clock signal. To accomplish this, the CPU 106 may write a particular pattern into a register (not shown). At step 212, the clock selection control firmware causes the CPU 106 to yield control of the data security device 100 to the tester 180.

It should be noted that the "true work" caused by execution of the device configuration determination firmware and the clock selection control firmware executed by the CPU 106 is done on the first pass through, in response to the system reset signal, sys_reset, caused by the master_power_good signal. That is, when the CPU 106 executes the device configuration determination firmware and the clock selection control firmware subsequently (i.e., in response to the system reset signal, sys_reset, caused by the master reset signal), the configuration of the data selector circuitry has already been set. Configuring the data selector circuitry 116 subsequent times has no effect.

Figure 3:
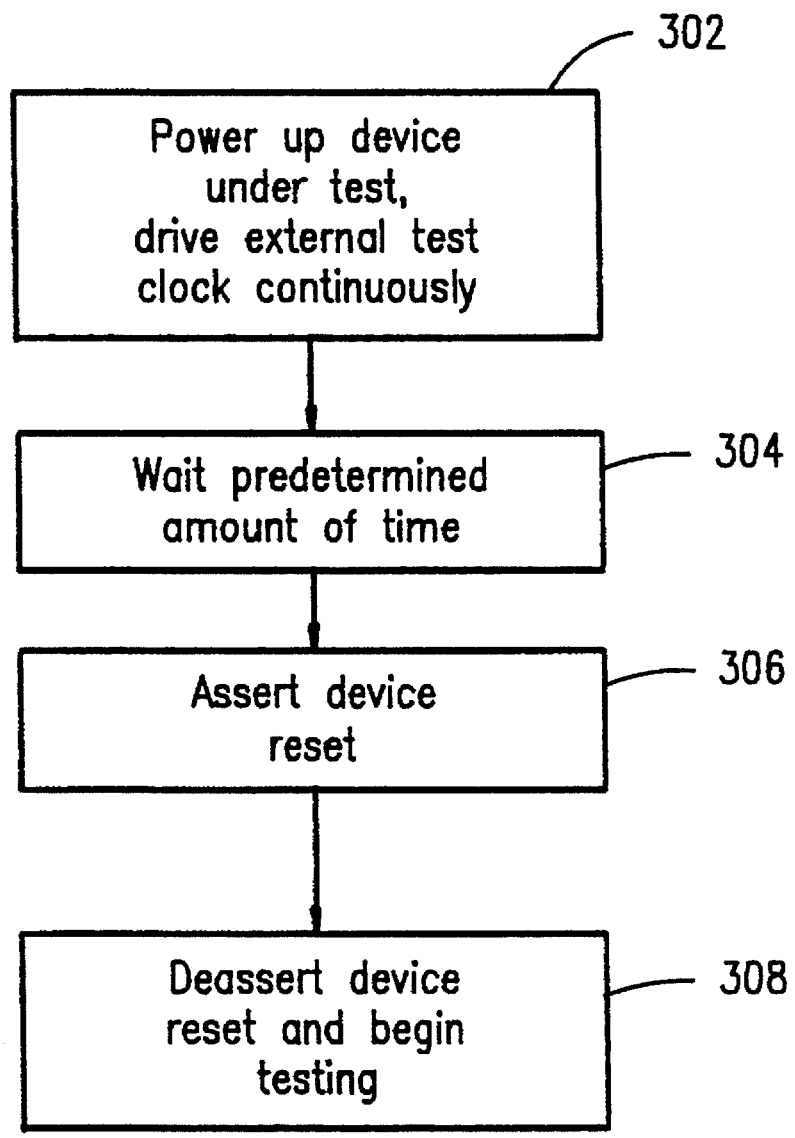
FIG. 3 is a flowchart illustrating operational flow of the tester of FIG. 1.

FIG. 3 is a flowchart of the steps to be followed by a tester 180 which may be employed to test the data security device 100. At step 302, the tester 180 controls the external power supply 126 to apply power to the data security device 100. The tester 180 continuously provides the external test clock. At step 304, the tester waits a predetermined amount of time. This is in order to give the device configuration determination firmware and the clock selection control firmware enough time to cause the CPU 106 to determine the configuration of the data security device and to cause the CPU 106 to control the clock services logic block to provide the tester clock, from the tester, as the system clock, SYS_CLK. At step 306, the tester asserts the master reset signal to the data security device 100 so that the tester can "synch up" with the data security device 100. Finally, at step 308, the tester deasserts the master reset signal to the data security device 100 (upon deassertion of the master reset signal, the data security device 100 is in a "known" state) and begins testing the data security device 100 by providing particular input signals to the data security device 100 at each cycle of the tester clock, strobing the outputs pins of the data security device 100 to determine output signals presented on the output pins, and comparing the actual output signals from the data security device 100 to what are expected to be the output signals from the data security device 100.

As discussed in the Background, if a data security device holds sensitive information, allowing the data security device to be controlled by an external clock may subject the sensitive information to compromise. For this reason, referring again to FIG. 1, it is preferable to protect against the possibility that a hardware fault will cause the clock services logic block 114 to inadvertently switch to providing an external clock as the system clock, SYS_CLK. That is, in preferred embodiments of the invention, the clock services logic block 114 includes protection circuitry 400, shown in detail in FIG. 4, that switches to providing the external clock only as the result of a sequence of actions. The protection circuitry 400 switches to providing an external clock as the system clock only if the actions are performed in order.

In addition, one attempting to gain access to the sensitive information stored with the data security device 100 may attempt to switch over to an externally provided clock signal by attacking the protection circuitry 400 itself. However, due to the design of the protection circuitry 400, no single component failure in the protection circuitry 400 will cause the externally provided clock to be provided as the system clock, SYS_CLK. Protection circuitry 400 is a preferred embodiment because, as discussed below, it provides glitch protection. However, the requirement that no single component failure will cause the externally provided clock to be provided as the system clock can also be implemented in a number of other ways.

These features significantly lower the risk that random occurrences, resulting either from unforeseen hardware faults or from intentional tampering, will cause the clock services logic block 114 to switch to providing the external clock as the system clock, SYS_CLK.

Figure 4:
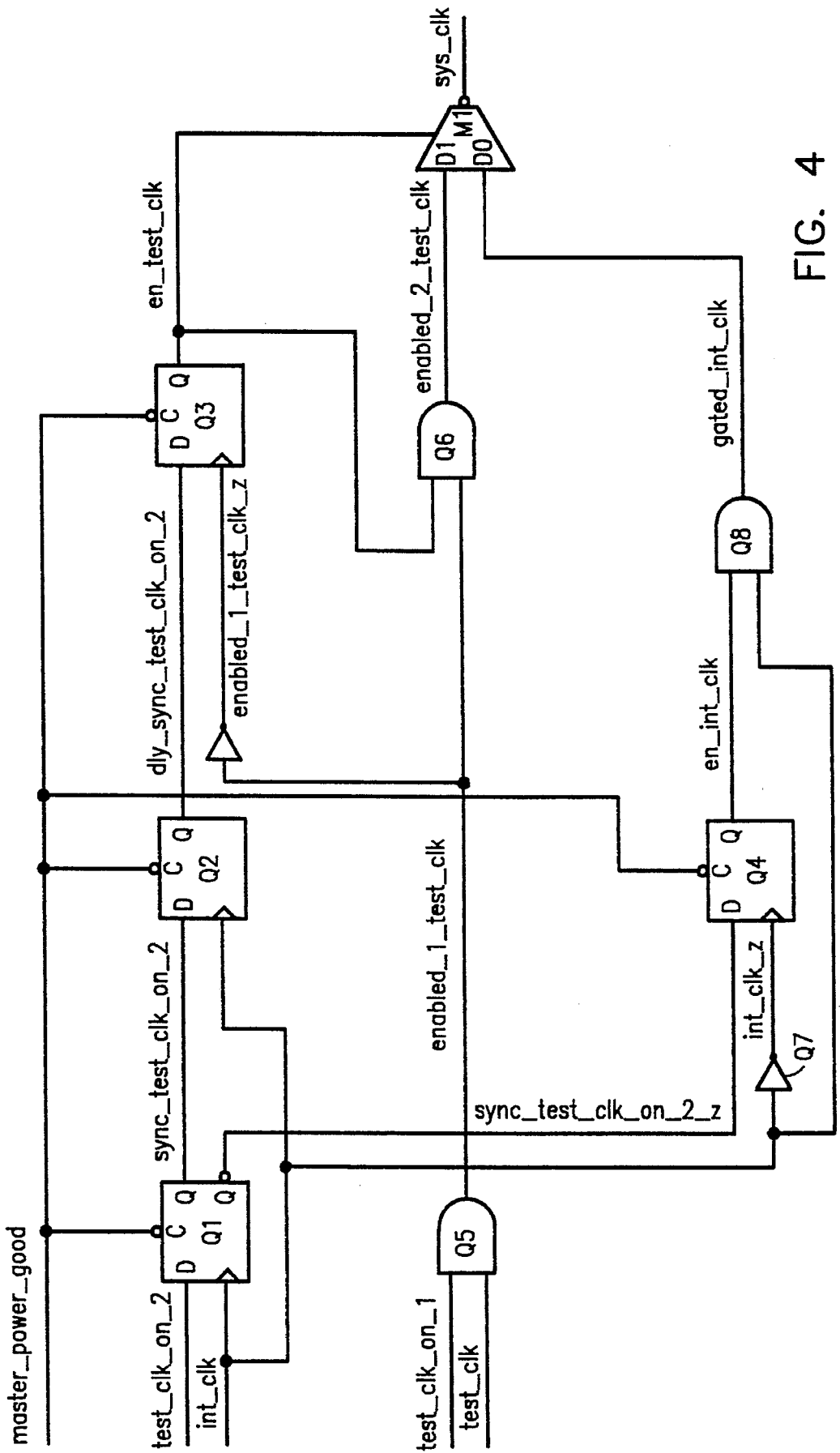
FIG. 4 is a circuit diagram illustrating protection circuitry that may be included in the clock services logic block of the FIG. 1 data security device.
Figure 5:
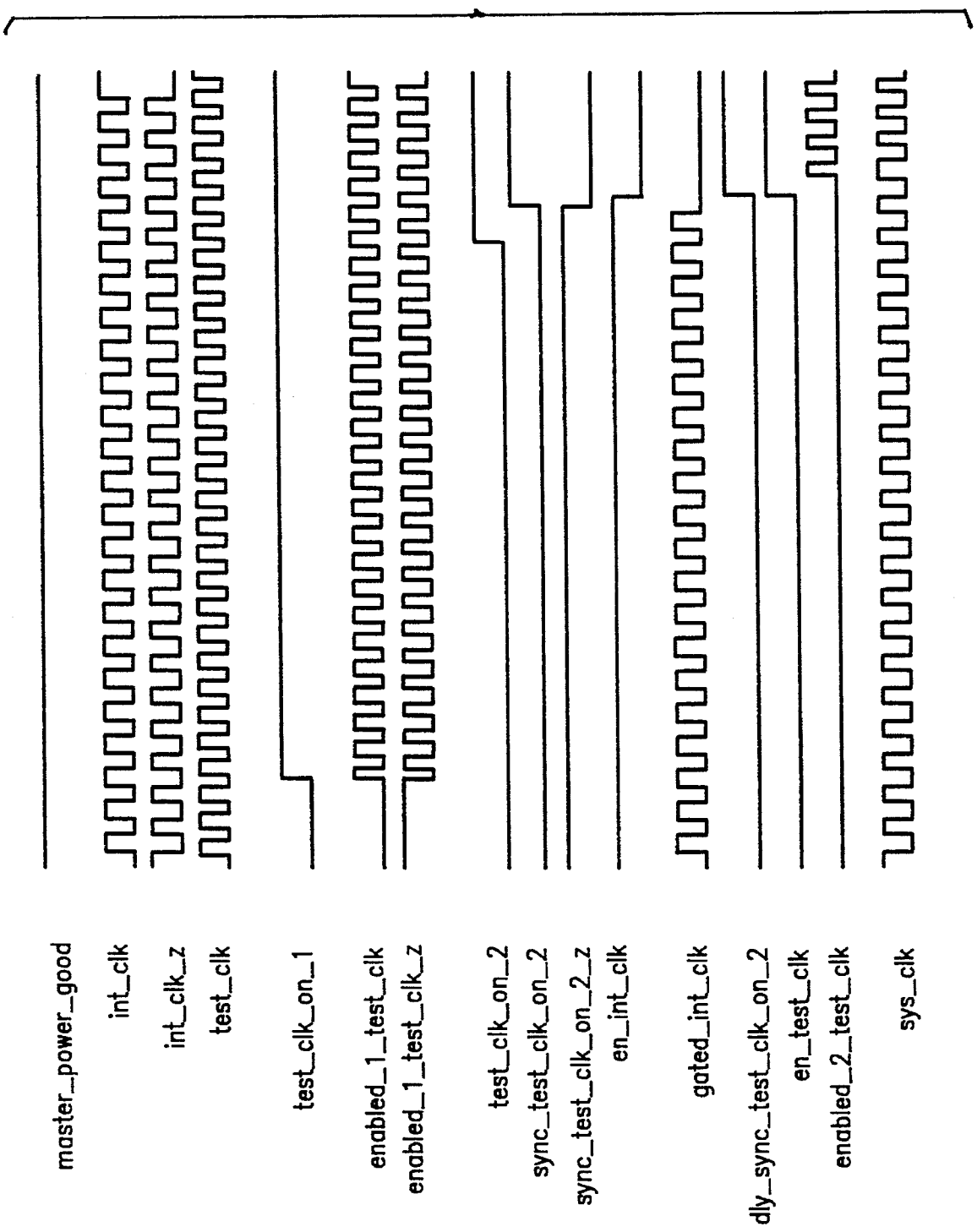
FIG. 5 is a timing diagram which illustrates the operation of the FIG. 4 circuit.

Referring now to FIG. 4 (and FIG. 5, which shows the relative timing of the signals in the FIG. 4 circuit), signals "test_clk_on_1" and "test_clk_on_2" are implemented in separate peripheral registers visible to the CPU 106. For example, the CPU 106 nay assert these signals by performing memory writes to an address to which the peripheral register are mapped. To cause the clock services logic block 114 to switch to providing the external clock as the system clock, SYS_CLK, the CPU 106 must first cause the test_clk_on_1 signal to be asserted and then cause the test_clk_on_2 signal to be asserted.

The operation of the FIG. 4 circuit is now explained in detail. First, upon application of power to the data security device 100 by the external power supply 126, the master_power_good signal is low (i.e., deasserted). Thus, in the initial "power up" state, the FIG. 4 circuit provides the internal clock, int_clk, as the system clock, sys_clk. Then, for the CPU 106 to switch to the external test clock (step 210 in FIG. 2), first, test_clk_on_1 is asserted. Then, test_clk_on_2 is asserted. On the first falling edge of int_clk after test_clk_on_2 is sampled by D flip-flop Q1, int_clk is gated off by the combination of inverter Q7, D flip-flop Q4, and AND device Q8. This prevents the signal sys_clk from glitching when data selector M1 switches from providing the internal clock (or, more properly, the gated internal clock, gated_int_clk) as the external clock (or, more properly, enabled_2_test_clk).

D flip flop Q2 delays enabling of the external clock in order to allow the internal clock, int_clk, to be gated before switching to the external clock. D flip flop Q3 provides the enabled external clock, enabled_2_test_clk at the falling edge of the external clock, thus preventing glitching of the clocks when the data selector M1 switches to providing the external clock.

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. A data security system unitarily formed in an integrated circuit, comprising:

a processor that operates in response to a clock signal provided at a clock input of the processor;

clock signal generation circuitry that generates an internal clock signal;

first processor-readable program code configured to cause the processor to detect an internal, protectable, non-volatile indication of a state of the integrated circuit data security system;

clock signal selection circuitry that selectively provides a path for the internal clock signal to be provided to the clock input of the processor or a path for an externally-provided clock signal to be provided to the clock input of the processor; and second processor-readable program code, responsive to the state indication, configured to cause the processor to control the selection by the clock signal selection circuitry.

2. A data security system as in claim 1, and further comprising an non-volatile memory that holds non-volatile data, wherein the first processor-readable program code includes:

third processor-readable program code configured to cause the processor to read at least a portion of the non-volatile data;

fourth processor-readable program code configured to cause the processor to detect the state indication from the non-volatile data read.

3. A data security system as in claim 2, wherein the fourth processor-readable code is configured to cause the processor to detect the state indication by determining if the non-volatile data read includes a predetermined data pattern indicating that the non-volatile data held in the non-volatile memory includes sensitive information.

4. A data security system as in claim 3, wherein the second processor-readable code is configured to cause the processor to control the clock signal selection circuitry to provide the path for an externally-provided clock signal to be provided to the clock input of the processor in response to a determination that the non-volatile data read does not include the predetermined data pattern.

5. A data security system as in claim 2, wherein the fourth processor-readable code is configured to cause the processor to detect the state indication by determining if the non-volatile data read includes a predetermined test data pattern.

6. A data security system as in claim 5, wherein the second processor-readable code is configured to cause the processor to control the clock selection circuitry to provide the path for an externally-provided clock signal to be provided to the clock input of the processor in response to a determination that the non-volatile data read does not include the predetermined test data pattern.

7. A data security system as in claim 1, and further comprising a non-volatile memory, wherein the second processor-readable code is configured to cause the processor to clear the non-volatile memory of sensitive information before controlling the clock signal selection circuitry to provide a path for an externally-provided clock signal to be provided to the clock input of the processor.

8. A data security system as in claim 7, wherein the clock signal selection circuitry includes circuitry that provides the path for an externally-provided clock signal to be provided to the clock input of the processor only in response to a predetermined sequence of signals, and wherein the second processor-readable code includes processor-readable code configured to cause the processor to cause the predetermined sequence of signals to be provided to the clock signal selection circuitry.

9. A data security system as in claim 1, wherein the processor includes circuitry for receiving a reset signal, wherein receipt of the reset signal by processor causes the processor to have a predetermined state and, further, and wherein the clock signal selection circuitry is not affected by the reset signal.

10. A data security system as in claim 1, wherein the clock signal selection circuitry includes means for preventing a single failure of the clock signal circuitry from causing the clock selection circuitry to provide the path for an externally-provided clock signal to be provided to the clock input of the processor.

\* \* \* \* \*